(12) United States Patent
Gray et al.

(10) Patent No.: US 8,365,016 B2
(45) Date of Patent: *Jan. 29, 2013

(54) PERFORMING MODE SWITCHING IN AN UNBOUNDED TRANSACTIONAL MEMORY (UTM) SYSTEM

(75) Inventors: Jan Gray, Bellevue, WA (US); Martin Taillefer, Redmond, WA (US); Yossi Levanoni, Redmond, WA (US); Ali-Reza Adl-Tabatabai, San Jose, CA (US); Dave Detlefs, Issaquah, WA (US); Vinod Grover, Mercer Island, WA (US); Mike Magruder, Sammamish, WA (US); Matt Tolton, Kirkland, WA (US); Bratin Saha, Santa Clara, CA (US); Gad Sheaffer, Haifa (IL); Vadim Bassin, Rannnana (IL)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/307,492

(22) Filed: Nov. 30, 2011

(65) Prior Publication Data

US 2012/0079215 A1  Mar. 29, 2012

Related U.S. Application Data

(63) Continuation of application No. 12/638,181, filed on Dec. 15, 2009, now Pat. No. 8,095,824.

(51) Int. Cl.
G06F 11/00 (2006.01)
(52) U.S. Cl. .......................... 714/16; 711/154
(58) Field of Classification Search ............ 714/16
See application file for complete search history.

(56) References Cited

U.S. PATENT DOCUMENTS

| | | | |
|---|---|---|---|
| 6,571,332 B1 | 5/2003 | Miranda et al. | |
| 6,640,285 B1 * | 10/2003 | Bopardikar et al. | 711/133 |
| 6,978,396 B2 * | 12/2005 | Ruuth et al. | 714/6.3 |
| 7,313,764 B1 | 12/2007 | Brunner et al. | |
| 7,395,382 B1 * | 7/2008 | Moir | 711/147 |
| 7,502,897 B2 * | 3/2009 | Hertzberg et al. | 711/152 |
| 7,542,977 B2 | 6/2009 | Hudson et al. | |
| 7,730,265 B1 * | 6/2010 | Cypher et al. | 711/141 |
| 8,060,482 B2 * | 11/2011 | Wang et al. | 707/703 |
| 8,095,824 B2 * | 1/2012 | Gray et al. | 714/16 |
| 2002/0108025 A1 * | 8/2002 | Shaylor | 711/203 |

(Continued)

FOREIGN PATENT DOCUMENTS

WO  WO 2010/151267 A1  12/2010

OTHER PUBLICATIONS

Dave Dice, et al, "Transactional Locking II," 2006, pp. 1-15.

(Continued)

*Primary Examiner* — Kamini Patel
(74) *Attorney, Agent, or Firm* — Trop, Pruner & Hu, P.C.

(57) ABSTRACT

In one embodiment, the present invention includes a method for selecting a first transaction execution mode to begin a first transaction in a unbounded transactional memory (UTM) system having a plurality of transaction execution modes. These transaction execution modes include hardware modes to execute within a cache memory of a processor, a hardware assisted mode to execute using transactional hardware of the processor and a software buffer, and a software transactional memory (STM) mode to execute without the transactional hardware. The first transaction execution mode can be selected to be a highest performant of the hardware modes if no pending transaction is executing in the STM mode, otherwise a lower performant mode can be selected. Other embodiments are described and claimed.

20 Claims, 6 Drawing Sheets

U.S. PATENT DOCUMENTS

| | | | |
|---|---|---|---|
| 2003/0126375 | A1 | 7/2003 | Hill et al. |
| 2004/0260972 | A1* | 12/2004 | Ji et al. ............................. 714/11 |
| 2005/0086446 | A1* | 4/2005 | McKenney et al. ........... 711/163 |
| 2006/0294326 | A1 | 12/2006 | Jacobson et al. |
| 2007/0143287 | A1 | 6/2007 | Adl-tabatabai et al. |
| 2007/0143741 | A1 | 6/2007 | Harris |
| 2007/0156780 | A1 | 7/2007 | Saha et al. |
| 2007/0156994 | A1* | 7/2007 | Akkary et al. ................ 711/167 |
| 2007/0162520 | A1 | 7/2007 | Petersen et al. |
| 2007/0186056 | A1* | 8/2007 | Saha et al. .................... 711/144 |
| 2007/0220294 | A1 | 9/2007 | Lippett |
| 2007/0239943 | A1* | 10/2007 | Dice et al. ..................... 711/147 |
| 2008/0010532 | A1* | 1/2008 | Lev et al. ......................... 714/35 |
| 2008/0162866 | A1 | 7/2008 | Saha et al. |
| 2008/0162881 | A1* | 7/2008 | Welc et al. .................... 712/206 |
| 2008/0162885 | A1* | 7/2008 | Wang et al. ................... 712/214 |
| 2008/0162886 | A1* | 7/2008 | Saha et al. .................... 712/214 |
| 2008/0162990 | A1* | 7/2008 | Wang et al. ..................... 714/19 |
| 2008/0163220 | A1* | 7/2008 | Wang et al. ................... 718/101 |
| 2008/0163881 | A1 | 7/2008 | Saunders et al. |
| 2008/0256073 | A1 | 10/2008 | Detlefs et al. |
| 2008/0270745 | A1 | 10/2008 | Saha et al. |
| 2009/0006767 | A1 | 1/2009 | Saha et al. |
| 2009/0013133 | A1 | 1/2009 | Cypher et al. |
| 2009/0019231 | A1 | 1/2009 | Cypher et al. |
| 2009/0031310 | A1 | 1/2009 | Lev et al. |
| 2009/0070774 | A1 | 3/2009 | Raikin et al. |
| 2009/0077329 | A1 | 3/2009 | Wood et al. |
| 2009/0144524 | A1* | 6/2009 | Shen et al. ...................... 712/30 |
| 2009/0172292 | A1* | 7/2009 | Saha et al. .................... 711/135 |
| 2009/0172303 | A1* | 7/2009 | Welc et al. .................... 711/154 |
| 2009/0172305 | A1* | 7/2009 | Shpeisman et al. ........... 711/154 |
| 2009/0172306 | A1* | 7/2009 | Nussbaum et al. ........... 711/154 |
| 2009/0172317 | A1* | 7/2009 | Saha et al. .................... 711/159 |
| 2009/0235105 | A1 | 9/2009 | Branover et al. |
| 2010/0070727 | A1 | 3/2010 | Harris et al. |
| 2010/0088702 | A1 | 4/2010 | Dern et al. |
| 2010/0122073 | A1 | 5/2010 | Narayanaswamy et al. |
| 2010/0191930 | A1 | 7/2010 | Groff et al. |
| 2010/0332538 | A1 | 12/2010 | Gray et al. |
| 2010/0332808 | A1* | 12/2010 | Adl-Tabatabai et al. ...... 712/225 |
| 2011/0145304 | A1* | 6/2011 | Gray et al. .................... 707/820 |
| 2011/0145552 | A1* | 6/2011 | Yamada et al. ............... 712/228 |
| 2011/0145637 | A1* | 6/2011 | Gray et al. ...................... 714/15 |
| 2011/0167222 | A1* | 7/2011 | Lee et al. ...................... 711/118 |

OTHER PUBLICATIONS

Patent Cooperation Treaty, Notification of Transmittal of the International Search Report and the Written Opinion of the international Searching Authority mailed Jul. 21, 2011 in international application No. PCT/US2010/056172.

Patent Cooperation Treaty, Notification of Transmittal of the International Search Report and the Written Opinion of the International Searching Authority mailed Jul. 24, 2011 in international application No. PCT/US2010/056142.

Patent Cooperation Treaty, Notification of Transmittal of the International Search Report and the Written Opinion of the International Searching Authority mailed Jul. 23, 2011 in international application No. PCT/US2010/054219.

C. Scott Ananian, et al., "Unbounded Transactional Memory," 2005, pp. 316-327.

Patent Cooperation Treaty, Notification of Transmittal of the International Search Report and the Written Opinion of the International Searching Authority mailed Jun. 27, 2011 in international application No. PCT/US2010/056320.

Nikos Anastopoulos, et al., "Facilitating Efficient Synchronization of Asymmetric Threads on Hyper-Threaded Processors," 2008, pp. 1-8.

Arrvindh Shriraman, et al., "Hardware Acceleration of Software Transactional Memory," May 18, 2006, pp. 1-10.

Sanjeev Kumar, et al., "Hybrid Transactional Memory," Mar. 29-31, 2005, pp. 1-28.

Bratin Saha, et al., "Architectural Support for Software Transactional Memory," Dec. 9-13, 2008, pp. 1-12.

Peter Damron, et al., "Hybrid Transactional Memory," Oct. 21-25, 2006, pp. 1-11.

U.S. Appl. No. 12/638,054, filed Dec. 15, 2009, entitled "Mechanisms to Accelerate Transactions Using Buffered Stores," by Ali-Reza Adl-Tabatabai, et al.

U.S. Appl. No. 12/638,064, filed Dec. 15, 2009, entitled "Handling Operating System (OS) Transitions in an Unbounded Transactional Memory (UTM) Mode," by Koichi Yamada, et al.

State Intellectual Property Office, P.R. China, First Office Action issued Mar. 1, 2010, in Chinese application serial No. 200680046532.2.

Moir, M., "Hybrid Transactional Memory," Announcement Sun Microsystems, Jul. 2005, pp. 1-15.

Stonebraker, M., "Virtual Memory Transaction Management," Operating Systems Review USA, vol. 18, No. 2, Apr. 1984, pp. 8-16.

Chang, A., et al., "801 Storage: Architecture and Programming," ACM Transactions on Computer Systems, ACM, New York NY, US, vol. 6, No. 1.1, Feb. 1988, pp. 28-50.

Lev Y., et al., "Towards a Safer Interaction with Transactional Memory by Tracking Object Visibility," Proceedings of Synchronization and Concurrency in Object-Oriented Languages (SCOOL), OOPSLA 2005 Workshop, Oct. 7, 2005, pp. 31-38.

Lie, S., "Hardware Support for Unbounded Transactional Memory," Master's Thesis, MIT Department of Electrical Engineering and Computer Science, May 7, 2004, pp. 1, 3, 7, 8, 85-102.

International Preliminary Report on Patentability (IPRP), Jun. 26, 2008, for International Application No. PCT/US2006/046499, 7 pages.

Moir M., "Hybrid Hardware/Software Transactional Memory," Sun Microsystems, Apr. 8, 2005, 21 pages.

PCT International Search Report and Written Opinion, Jun. 12, 2007 for International Application No. PCT/US2006/046499, 11 pages.

Sukha, J., "Memory-Mapped Transactions," Master's Thesis, MIT Department of Electrical Engineering and Computer Science, Jun. 2005, 92 pages.

Ennals, R., "Software Transactional Memory Should Not Be Obstruction-Free," Sep. 14, 2005.

Harris, T., et al., "Language Support for Lightweight Transactions," Proceedings of the 18th Annual ACM SIGPLAN Conference on Object-oriented Programming, Systems, Languages, and Applications, Oct. 2003, pp. 388-402.

Herlihy, M, et al., "Transaction Memory: Architectural Support for Lock-Free Data Structures," Proceedings of the 20th Annual International Symposium on Computer Architecture, 1993, pp. 289-300.

Hewlett-Packard Development Company, "Memory-Relevant Portions of the Processor," Sep. 18, 2005.

Lie, S., et al., "An Integrated Hardware-Software Approach to Transactional Memory," MIT Computer Science and Artificial Intelligence Laboratory, Feb. 2004, pp. 1-2.

Lie, S., "An Integrated Hardware-Software Approach to Transactional Memory," 6.895 Theory of Parallel Systems, Paper, pp. 1-18.

Lie, S., "An Integrated Hardware-Software Approach to Transactional Memory," 6.895 Theory of Parallel Systems, Presentation, Dec. 8, 2003.

Rajwar, R., et al., "Virtualizing Transactional Memory," ACM SIGARCH Computer Architecture News, vol. 33, Issue 2, May 2005, pp. 494-505.

Stenstrom, P., "A Survey of Cache Coherence Schemes for Multiprocessors," Computer, vol. 23, Issue 6, Jun. 1990, pp. 12-24.

* cited by examiner

PERFORMING MODE SWITCHING IN AN UNBOUNDED TRANSACTIONAL MEMORY (UTM) SYSTEM

This application is a continuation of U.S. patent application Ser. No. 12/638,181, filed Dec. 15, 2009, now U.S. Pat. No. 8,095,824 the content of which is hereby incorporated by reference.

BACKGROUND

In modern computing systems, multiple processors can be present and each such processor may execute different threads of code of a common application. To maintain consistency, data synchronization mechanisms may be used. One such technique includes the use of transactional memory (TM). Often transactional execution includes executing a grouping of a plurality of micro-operations, operations, or instructions. Each of multiple threads may execute and access common data within a memory structure. If both threads access/alter the same entry within the structure, conflict resolution may be performed to ensure data validity. One type of transactional execution includes Software Transactional Memory (STM), where tracking of memory accesses, conflict resolution, abort tasks, and other transactional tasks are performed in software, generally without the support of hardware.

Another type of transactional execution includes a Hardware Transactional Memory (HTM) system, where hardware is included to support access tracking, conflict resolution, and other transactional tasks. Previously, actual memory data arrays were extended with additional bits to hold information, such as hardware attributes to track reads, writes, and buffering, and as a result, the data travels with the data from the processor to memory. Often this information is referred to as persistent, i.e. it is not lost upon a cache eviction, since the information travels with data throughout the memory hierarchy. Yet, this persistency imposes more overhead throughout the memory hierarchy system.

Yet another type of TM model is referred to as an unbounded transactional memory (UTM), which enables arbitrarily large transactions in time and memory footprint to occur through a combination of hardware acceleration using hardware and software. Running and implementing UTM transactions typically require specially compiled code for implementing concurrency control mechanisms with UTM hardware acceleration interfaces. As a result, UTM transactions can be complex and may not correctly interact with existing hardware and STM transactional systems.

DETAILED DESCRIPTION

Figure 1:
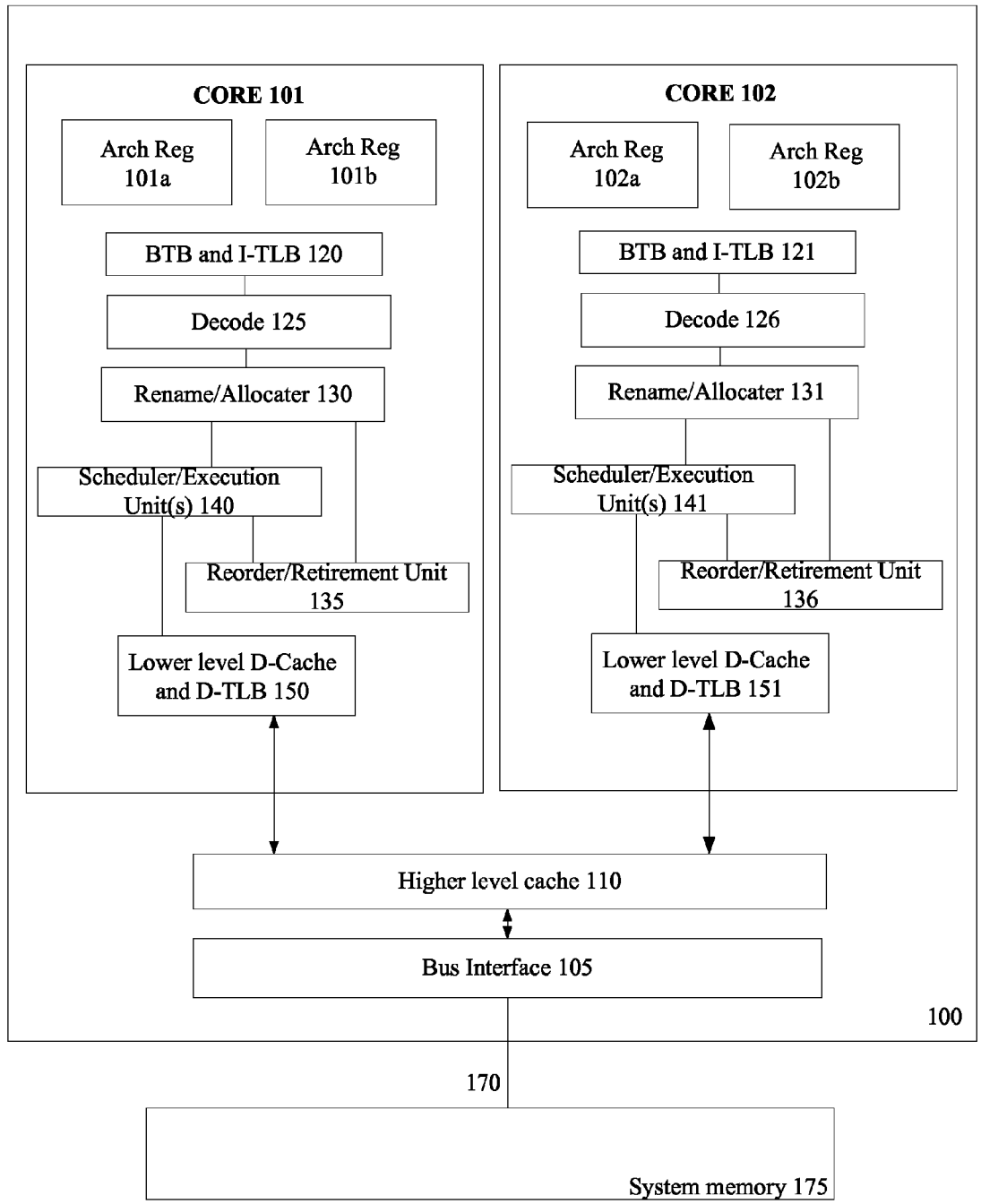
FIG. 1 is a block diagram of a processor in accordance with one embodiment of the present invention.

In various embodiments, a TM implementation can run different thread transactions in different modes, and modes can be switched for various reasons, including software conflict management or use of unsupported semantics or operations (such as nested transactions, retry, debugging, or external transactions). A UTM system in accordance with an embodiment of the present invention affords a large design space of execution modes with different performance, flexibility (semantic richness) and capacity considerations. The modes are, in general, a combination of transactional, code generation, processor and common language runtime (CLR) modes. While this constitutes a large space, particular modes most relevant to the discussion are introduced.

Transactional memory code may be executed in a variety of transactional modes. Different transactional modes may require, or at least benefit, from different code generation strategies. The transactional execution modes include the following. Non-transactional (NT), which is classic execution mode with no isolation or failure atomicity, and thus entails no transactional logging or locking. A cache resident non-locking (CRNL) mode, also referred to as cache resident implicit transactional mode (CRITM), in which an entire transactional read/write set is maintained in a cache memory, and transactional conflicts are detected in hardware. In this mode, no logging or other instrumentation is needed, and no software-compatible locks are acquired. CRNL, in one embodiment, thus only supports relatively small transactions whose data set fits completely in a processor cache. Another mode is a cache resident (CR) mode (also referred to as cache resident, explicit transaction mode (CRESTM)), in which an entire transactional read/write set in stored in a cache, and transactional conflicts can be detected in hardware. No logging or other instrumentation is needed in this mode, but software-compatible locks are acquired. CR, like CRNL mode above, in various embodiments only supports relatively small transactions whose data set fits completely in the processor cache.

Yet another mode is a software mode with hardware assisted monitoring and filtering (HAMF), which is a software mode that uses UTM monitoring facilities to detect transactional conflicts, as well as for filtering. In this mode, software-compatible locks are acquired. Another mode is a software mode with hardware assisted filtering (HAF) in which UTM facilities are used for filtering only. Software logging is performed in this mode, and software-compatible locks are acquired. Generally these last two modes can be referred to as hardware assisted STM (HASTM) modes. Finally, software transactional memory (STM) mode is a pure software mode using no UTM resources.

In order to support the different transactional modes, particular chunks of source code can be translated into distinct binary code sequences. Naked (NK) refers to classic code with no particular transactional instrumentation. Transactional VTable (TV) is a code generation mode which embeds indirect function calls for individual object field accesses to enable proper transactional logging and locking. A dispatch table (vtable) is used to dispatch the different functions in order to enable this generated code to be used to support a variety of transactional modes.

In turn, a processor can execute in one of three basic modes with regard to the UTM properties of monitoring and buffering relating to transactions. A first mode, MB_ALL, may be selected in which all loads and stores induce hardware monitoring and buffering. This is generally the simplest way to use the UTM facilities, but may lead to monitoring and buffering being applied to ranges of memory that do not require it (like read-only state or a stack). A second mode, MB_DATA, may be selected in which all loads and stores for which a hardware transaction makes memory accesses relative to a segment register are buffered/monitored by default. In this mode, all stack accesses have potentially unmonitored move (PUMOV) semantics, i.e., if a load reads a buffered cache line it reads the buffered contents; if a store writes to a non-buffered cache line it behaves like a normal write; if it writes to a buffered cache line then both the buffered and main copy are updated. This mode provides fine-grain control over what the hardware buffers and monitors and generally allows transactions to hold more useful data than MB_ALL mode, at the cost of more complex code generation decisions. A third mode, MB_NONE, may be selected in which no automatic buffering and monitoring of loads and stores occurs. Instead, the UTM ISA provides specialized instructions to induce buffering or monitoring of particular memory locations. Note that the execution modes merely control the instructions that are used to set UTM state within the processor cache. Once the state is set in the cache, it is not possible to determine which mode was used to set the state.

The native code in a common language runtime (CLR) may be invoked in different modes including: non-transactional, which is the classic way in which the CLR's native code is invoked; an implicit transactional mode that occurs when the CLR code is invoked while the current thread is executing a hardware transaction and the processor is configured for MB_DATA; and an explicit transactional mode that occurs when the CLR code is invoked while the current thread is executing a hardware transaction and the processor is configured for MB_NONE, or when the current thread is executing a software transaction. The different ways the CLR is invoked determines what the native code needs to do in order to access the managed environment's current state. In non-transactional and implicit modes, the CLR can directly read the managed state unimpeded. In explicit transactional mode, the CLR may employ helper functions to access the managed state.

As background of implementations that can be used in an unbounded TM (UTM) system, it is instructive to look at example hardware that can be used for UTM transactions. In general, a UTM transaction enables use of hardware in connection with transactions that can be fully implemented in hardware, namely cache resident transactions, and unbounded transactions that execute using a combination of hardware and software. Referring to FIG. 1, an embodiment of a processor capable of executing multiple threads concurrently is illustrated. Note, processor 100 may include hardware support for hardware transactional execution. Either in conjunction with hardware transactional execution, or separately, processor 100 may also provide hardware support for hardware acceleration of a STM, separate execution of a STM, or a combination thereof, e.g., UTM in accordance with an embodiment of the present invention. Processor 100 may be any type of processor, such as a micro-processor, an embedded processor, a digital signal processor (DSP), a network processor, or other device to execute code. Processor 100, as illustrated, includes a plurality of processing elements.

Physical processor 100, as illustrated in FIG. 1, includes two cores, core 101 and 102, which share access to higher level cache 110. Although processor 100 may include asymmetric cores, i.e., cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e., four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. The architecture state registers may, in one embodiment, include registers for use in implementing UTM transaction, e.g., a transaction status register (TSR), transaction control register (TCR), and an ejection instruction pointer register to identify a location of an ejection handler that can be used to handle events accordingly during a transaction (such as an abort of a transaction).

Other smaller resources, such as instruction pointers and renaming logic in rename allocator logic 130 may also be replicated for threads 101a and 101b. Some resources, such as re-order buffers in reorder/retirement unit 135, instruction translation lookaside buffer (ITLB) 120, load/store buffers, and queues may be shared through partitioning. Other resources, such as general purpose internal registers, pagetable base register, low-level data-cache and data-TLB 115, execution unit(s) 140, and portions of out-of-order unit 135 are potentially fully shared.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e., a type of instruction cache, may instead be coupled after decoder 125 to store recently decoded traces. Module 120 also potentially includes a branch target buffer to predict branches to be executed/taken and a ITLB to store address translation entries for instructions.

Decode module 125 is coupled to fetch unit 120 to decode fetched elements. In one embodiment, processor 100 is associated with an ISA, which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 100 is capable of hardware transactional execution, software transactional execution, or a combination or hybrid thereof. A transaction, which may also be referred to as a critical or atomic section of code, includes a grouping of instructions, operations, or micro-operations to be executed as an atomic group. For example, instructions or operations may be used to demarcate a transaction or a critical section. In one embodiment, these instructions are part of a set of instructions, such as an ISA, which are recognizable by hardware of processor 100, such as decoders described above. Often, these instructions, once compiled from a high-level language to hardware recognizable assembly langue include operation codes (opcodes), or other portions of the instructions, that decoders recognize during a decode stage.

Typically, during execution of a transaction, updates to memory are not made globally visible until the transaction is committed. As an example, a transactional write to a location is potentially visible to a local thread, yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible.

However, if the transaction is invalidated during its pendency, the transaction is aborted and potentially restarted without making the updates globally visible. As a result, pendency of a transaction, as used herein, refers to a transaction that has begun execution and has not been committed or aborted, i.e., pending.

In one embodiment, processor 100 is capable of executing transactions utilizing hardware/logic, i.e., within a Hardware Transactional Memory (HTM) system. Numerous specific implementation details exist both from an architectural and microarchitectural perspective when implementing an HTM; most of which are not discussed herein to avoid unnecessarily obscuring embodiments of the invention. However, some structures and implementations are disclosed for illustrative purposes. Yet, it should be noted that these structures and implementations are not required and may be augmented and/or replaced with other structures having different implementation details.

In general, processor 100 may be capable of executing transactions within a UTM system, which attempts to take advantage of the benefits of both STM and HTM systems. For example, an HTM is often fast and efficient for executing small transactions, because it does not rely on software to perform all of the access tracking, conflict detection, validation, and commit for transactions. However, HTMs are usually only able to handle smaller transactions, while STMs are able to handle unbounded sized transactions. Therefore, in one embodiment, a UTM system utilizes hardware to execute smaller transactions and software to execute transactions that are too big for the hardware. As can be seen from the discussion below, even when software is handling transactions, hardware may be utilized to assist and accelerate the software. The same hardware may also be utilized to support and accelerate a pure STM system.

As stated above, transactions include transactional memory accesses to data items both by local processing elements within processor 100, as well as potentially by other processing elements. Without safety mechanisms in a transactional memory system, some of these accesses would potentially result in invalid data and execution, i.e., a write to data invalidating a read, or a read of invalid data. As a result, processor 100 may include logic to track or monitor memory accesses to and from data items for identification of potential conflicts, such as read monitors and write monitors, as discussed below.

In one embodiment, processor 100 includes monitors to detect or track accesses, and potential subsequent conflicts, associated with data items. As one example, hardware of processor 100 includes read monitors and write monitors to track loads and stores, which are determined to be monitored, accordingly. As an example, hardware read monitors and write monitors are to monitor data items at a granularity of the data items despite the granularity of underlying storage structures. In one embodiment, a data item is bounded by tracking mechanisms associated at the granularity of the storage structures to ensure that at least the entire data item is monitored appropriately.

As a specific illustrative example, read and write monitors include attributes associated with cache locations, such as locations within lower level data cache 150, to monitor loads from and stores to addresses associated with those locations. Here, a read attribute for a cache location of data cache 150 is set upon a read event to an address associated with the cache location to monitor for potential conflicting writes to the same address. In this case, write attributes operate in a similar manner for write events to monitor for potential conflicting reads and writes to the same address. To further this example, hardware is capable of detecting conflicts based on snoops for reads and writes to cache locations with read and/or write attributes set to indicate the cache locations are monitored, accordingly. Inversely, setting read and write monitors, or updating a cache location to a buffered state, in one embodiment, results in snoops, such as read requests or read for ownership requests, which allow for conflicts with addresses monitored in other caches to be detected.

Therefore, based on the design, different combinations of cache coherency requests and monitored coherency states of cache lines result in potential conflicts, such as a cache line holding a data item in a shared read monitored state and a snoop indicating a write request to the data item. Inversely, a cache line holding a data item being in a buffered write state and an external snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting, as well as status registers to report the conflicts.

However, any combination of conditions and scenarios may be considered invalidating for a transaction, which may be defined by an instruction, such as a commit instruction. Examples of factors that may be considered for non-commit of a transaction include detecting a conflict to a transactionally accessed memory location, losing monitor information, losing buffered data, losing metadata associated with a transactionally accessed data item, and detecting an other invalidating event, such as an interrupt, ring transition, or an explicit user instruction (assuming that a resumed transaction cannot be continued).

In one embodiment, hardware of processor 100 is to hold transactional updates in a buffered manner. As stated above, transactional writes are not made globally visible until commit of a transaction. However, a local software thread associated with the transactional writes is capable of accessing the transactional updates for subsequent transactional accesses. As a first example, a separate buffer structure is provided in processor 100 to hold the buffered updates, which is capable of providing the updates to the local thread and not to other external threads. Yet, the inclusion of a separate buffer structure is potentially expensive and complex.

In contrast, as another example, a cache memory, such as data cache 150, is utilized to buffer the updates, while providing the same transactional functionality. Here, cache 150 is capable of holding data items in a buffered coherency state; in one case, a new buffered coherency state is added to a cache coherency protocol, such as a Modified Exclusive Shared Invalid (MESI) protocol to form a MESIB protocol. In response to local requests for a buffered data item, namely a data item being held in a buffered coherency state, cache 150 provides the data item to the local processing element to ensure internal transactional sequential ordering. However, in response to external access requests, a miss response is provided to ensure the transactionally updated data item is not made globally visible until commit. Furthermore, when a line of cache 150 is held in a buffered coherency state and selected for eviction, the buffered update is not written back to higher level cache memories—the buffered update is not to be proliferated through the memory system, i.e., not made globally visible, until after commit. Upon commit, the buffered lines are transitioned to a modified state to make the data item globally visible.

Note that the terms internal and external are often relative to a perspective of a thread associated with execution of a transaction or processing elements that share a cache. For example, a first processing element for executing a software thread associated with execution of a transaction is referred to a local thread. Therefore, in the discussion above, if a store to or load from an address previously written by the first thread, which results in a cache line for the address being held in a buffered coherency state, is received, then the buffered version of the cache line is provided to the first thread since it is the local thread. In contrast, a second thread may be executing on another processing element within the same processor, but is not associated with execution of the transaction responsible for the cache line being held in the buffered state—an external thread; therefore, a load or store from the second thread to the address misses the buffered version of the cache line, and normal cache replacement is utilized to retrieve the unbuffered version of the cache line from higher level memory.

Here, the internal/local and external/remote threads are being executed on the same processor, and in some embodiments, may be executed on separate processing elements within the same core of a processor sharing access to the cache. However, the use of these terms is not so limited. As stated above, local may refer to multiple threads sharing access to a cache, instead of being specific to a single thread associated with execution of the transaction, while external or remote may refer to threads not sharing access to the cache.

As stated above in the initial reference to FIG. 1, the architecture of processor 100 is purely illustrative for purpose of discussion. For example, in other embodiments UBT hardware can be implemented for a processor with a much simpler in-order execution processor design, which may not include complex rename/allocator and reorder/retirement units. Similarly, the specific examples of translating data addresses for referencing metadata is also exemplary, as any method of associating data with metadata in separate entries of the same memory may be utilized.

Figure 2:
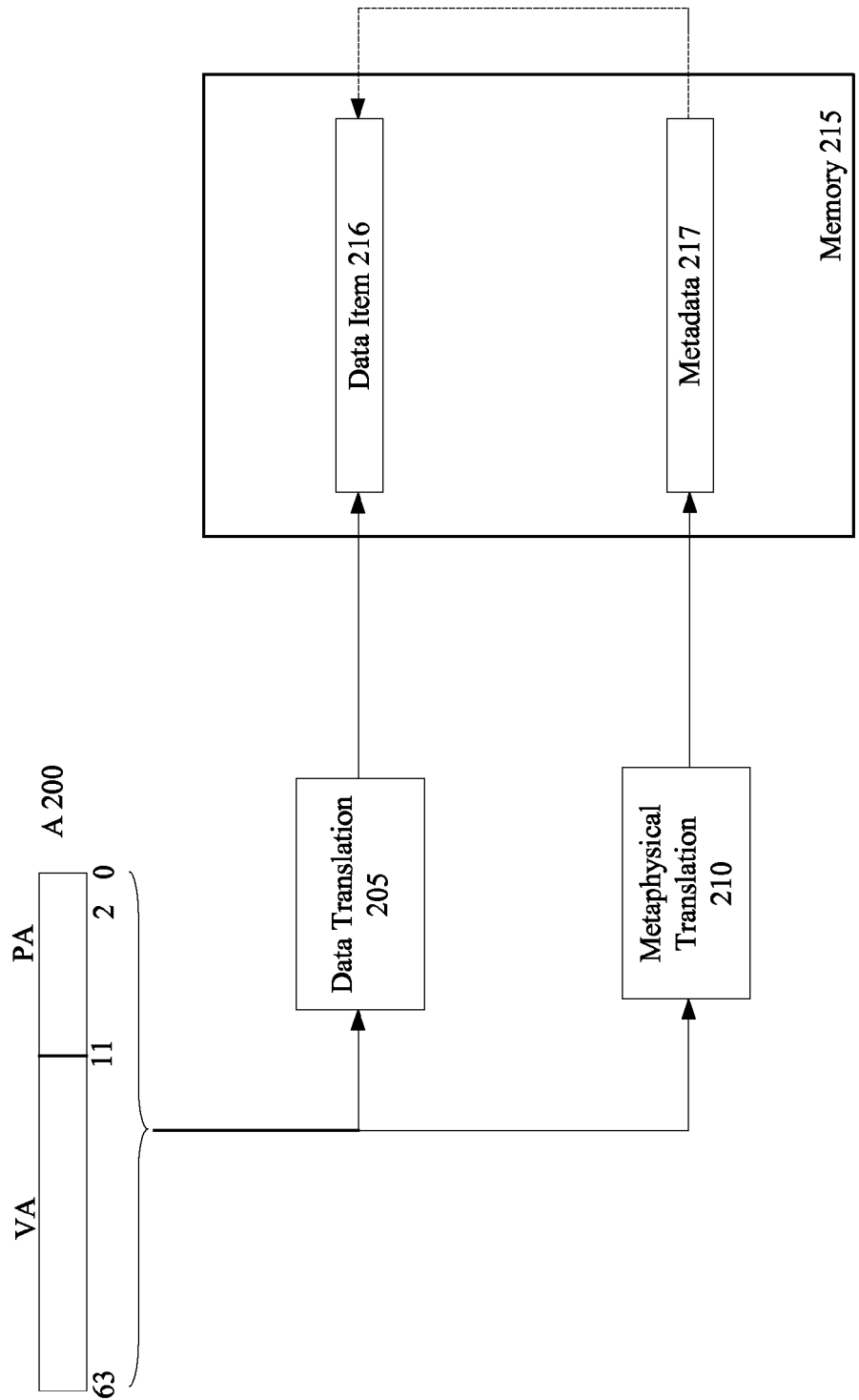
FIG. 2 is a block diagram of holding metadata for a data item in a processor in accordance with one embodiment of the present invention.

Turning to FIG. 2, an embodiment of holding metadata for a data item in a processor is illustrated. As depicted, metadata 217 for data item 216 is held locally in memory 215. Metadata includes any property or attribute associated with data item 216, such as transactional information relating to data item 216. Some illustrative examples of metadata are included below; yet the disclosed examples of metadata are purely illustrative. As such, metadata location 217 may hold any combination of information and other attributes for data item 216.

As a first example, metadata 217 includes a reference to a backup or buffer location for transactionally written data item 216, if data item 216 has been previously accessed, buffered and/or backed up within a transaction. Here, in some implementations a backup copy of a previous version of data item 216 is held in a different location, and as a result, metadata 217 includes an address, or other reference, to the backup location. Alternatively, metadata 217 itself may act as a backup or buffer location for data item 216.

As another example, metadata 217 includes a filter value to accelerate repeat transactional accesses to data item 216. Often, during execution of a transaction utilizing software, access barriers are performed at transactional memory accesses to ensure consistency and data validity. For example, before a transactional load operation a read barrier is executed to perform read barrier operations, such as testing if data item 216 is unlocked, determining if a current read set of the transaction is still valid, updating a filter value, and logging of version values in the read set for the transaction to enable later validation. However, if a read of that location has already been performed during execution of the transaction, then the same read barrier operations are potentially unnecessary.

As a result, one solution includes utilizing a read filter to hold a first default value to indicate data item 216, or the address therefore, has not been read during execution of the transaction and a second accessed value to indicate that data item 216, or the address therefore, has already been accessed during a pendency of the transaction. Essentially, the second accessed value indicates whether the read barrier should be accelerated. In this instance, if a transactional load operation is received and the read filter value in metadata location 217 indicates that data item 216 has already been read, then, in one embodiment, the read barrier is elided—not executed—to accelerate the transactional execution by not performing unnecessary, redundant read barrier operations. Note that a write filter value may operate in the same manner with regard to write operations. However, individual filter values are purely illustrative, as, in one embodiment, a single filter value is utilized to indicate if an address has already been accessed—whether written or read. Here, metadata access operations to check metadata 217 for 216 for both loads and stores utilize the single filter value, which is in contrast to the examples above where metadata 217 includes a separate read filter value and write filter value. As a specific illustrative embodiment, four bits of metadata 217 are allocated to a read filter to indicate if a read barrier is to be accelerated in regards to an associated data item, a write filter to indicate if a write barrier is to be accelerated in regards to an associated data item, an undo filter to indicate undo operations are to be accelerated, and a miscellaneous filter to be utilized in any manner by software as a filter value.

A few other examples of metadata include an indication of, representation of, or a reference to an address for a handler—either generic or specific to a transaction associated with data item 216, an irrevocable/obstinate nature of a transaction associated with data item 216, a loss of data item 216, a loss of monitoring information for data item 216, a conflict being detected for data item 216, an address of a read set or read entry within a read set associated with data item 216, a previous logged version for data item 216, a current version of data item 216, a lock for allowing access to data item 216, a version value for data item 216, a transaction descriptor for the transaction associated with data item 216, and other known transaction related descriptive information. Furthermore, as described above, use of metadata is not limited to transactional information. As a corollary, metadata 217 may also include information, properties, attributes, or states associated with data item 216, which are not involved with a transaction.

With this background to a UTM system, next consideration of how to initiate a transaction will be discussed. As threads enter transactions, they transition to one of the TM execution modes. If no thread is in any type of STM mode (generally, any of the STM modes are referred to as *STM mode), the current thread may use implicit-mode CRITM. Many threads may thus be in CRITM mode. If a thread overflows hardware's bounded capacity or executes some semantic action that cannot be done in the current mode, the CRITM transaction will roll back and re-execute in some *STM mode. Once any thread is in a *STM mode, all other threads must leave CRITM mode (rollback) and re-execute in an STM lock-respecting mode such as CRESTM. There are several possible execution variant combinations, for example, CRITM and CRESTM. For purposes of discussion, this combination of modes will be used herein.

Table 1 compares these two example transaction execution modes with each other and with the contemporary plain, non-transactional, mode.

change at re-execution time. A transaction could 'fallback' to a lower performance mode or 'upgrade' to a higher performance mode. That is, not all modes are equal from a performance perspective. In general, CRITM is the most performant execution mode since it avoids the overheads of dealing with software locks. The next performant mode is CRESTM followed by HASTM and then STM. STM and HASTM modes are equivalent in the functionality they provide, thus STM is used to represent both these modes in the discussion below.

All transactions cannot run in CRITM mode however, since it only operates on cache resident transactions. Since CRESTM mode is also limited to cache resident transactions, any transaction that is not cache resident needs to run under a STM mode. CRITM mode is not compatible with STM mode, so as soon as one transaction starts operating under STM mode, no transaction can run under CRITM mode. Thus at this point, all cache resident transactions move to the CRESTM mode.

The broad constraints on which mode a transaction is executed under can be summarized as follows: all transactions start out in CRITM mode, however if a STM transaction is running all transactions start out in CRESTM mode. If a transaction overflows the cache, then it rolls back and restarts executing under STM mode. If a transaction is executing under STM mode, then all CRITM transactions are doomed and restart executing under CRESTM mode.

In one embodiment, there are some additional constraints around support for a 'retry' primitive: if a transaction uses the 'retry' primitive, it can only execute in STM mode, since CRITM and CRESTM do not support waiting for retry. If any transaction in the system is waiting on a 'retry', all other transactions need to execute in CRESTM or STM modes, since CRITM does not support notification.

Figure 3:
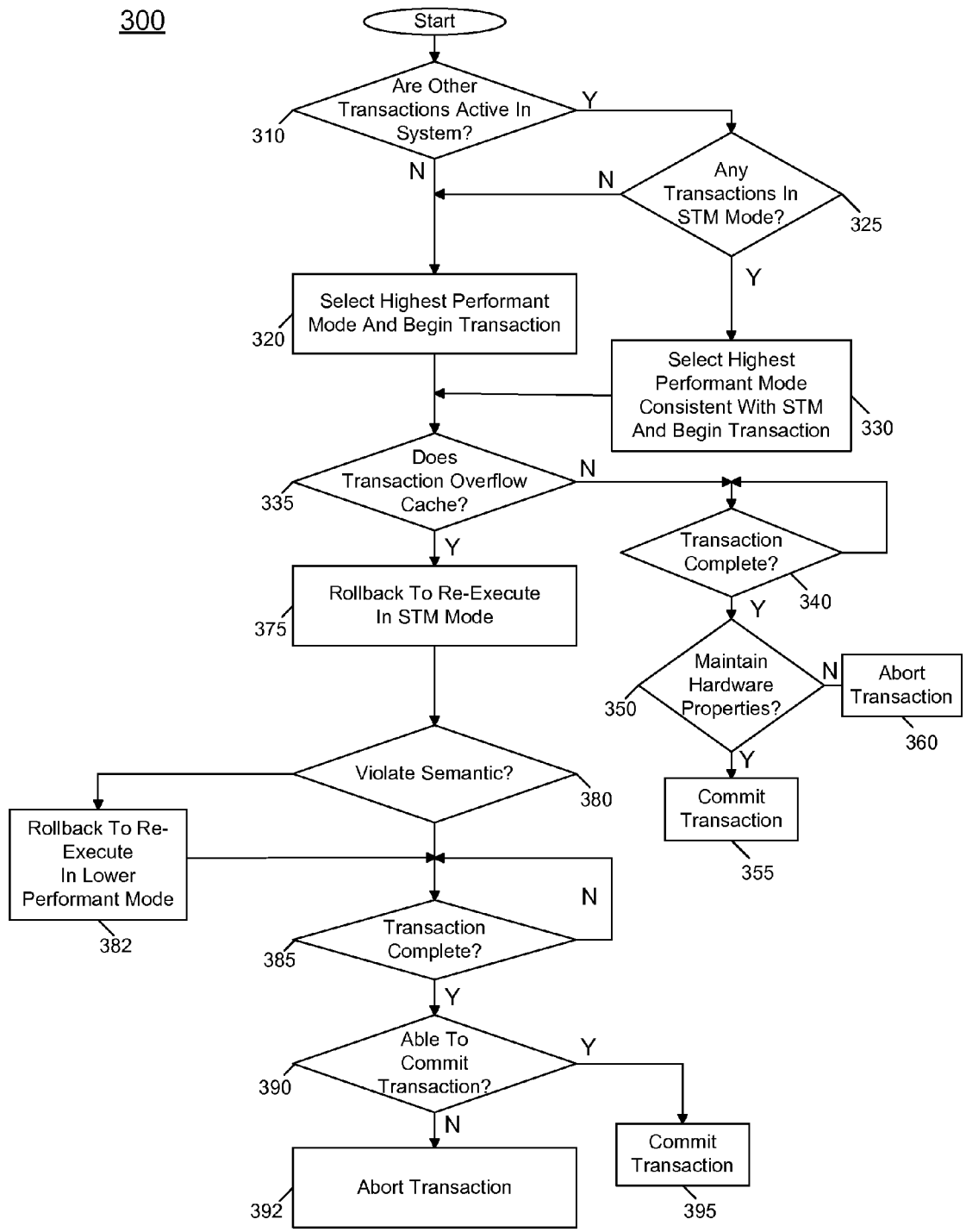
FIG. 3 is a flow diagram of a method for selecting a transaction mode for performing a TM transaction in accordance with an embodiment of the present invention.

Referring now to FIG. 3, shown is a flow diagram of a method for selecting a transaction execution mode for performing a TM transaction in accordance with an embodiment of the present invention. In one embodiment, method 300 may be implemented by a runtime of a UTM system. As seen, FIG. 3 may begin by determining whether other transactions are active in the system (diamond 310). This is done, as certain hardware transaction modes are incompatible with STM transactions. If no other such transactions are active, control passes to block 320 where the transaction may be begun in the highest performant mode available. In the context described herein, the highest performant mode may be a

TABLE 1

| Execution Variant | Description | Transact. Mode | Transact. Compat. | Code Gen Mode | CPU Mode | CLR Mode |
|---|---|---|---|---|---|---|
| Plain | Non transactional | NT | N/A | NK | MB_NONE | Non transactional |
| CRITM | Cache resident, implicit mode, no software locks | CRNL | CRNL | NK | MB_DATA | Transactional implicit |
| CRESTM | Cache resident, explicit mode, using software locks and transactional vtable | CR | CR, HAMF, HAF, STM | TV | MB_NONE | Transactional explicit |

It is inevitable that some transactions will fail, e.g., due to loss of buffered data or a conflict, and as such the transaction will abort. In some instances, a transaction's mode may hardware implicit transaction mode (e.g., CRITM). Of course in different implementations, different modes or modified modes may be available.

If instead it is determined at diamond 310 that other transactions are active, control passes to diamond 325 where it may be determined whether any of these transactions are in an STM mode. If so, the new transaction may be begun in the highest performant mode that is consistent with STM mode (block 330). For example, in implementations discussed herein, this highest compatible mode may be a hardware explicit mode (e.g., CRESTM) in which hardware assists with transactions, which may be fully resident within a processor cache, but software locks are respected.

Accordingly, the transaction is begun and operation continues. Then it may be determined whether an overflow occurs (diamond 335). That is, as all transactions may begin in some type of cache resident hardware assisted mode, it is possible that the cache space is insufficient to handle the full transaction. Accordingly, if an overflow occurs as determined at diamond 335, control may pass to block 375, which will be discussed further below. If instead the transaction does not overflow, next it may be determined whether the transaction has completed (diamond 340). If not, continued execution may occur. If the transaction has completed, control passes to diamond 350 where it may be determined whether the hardware properties of the transaction have been maintained. That is, before the transaction commits, various hardware properties, e.g., UTM properties of buffering, monitoring and metadata, may be checked to determine that they are still active without loss. If not, a loss of some hardware property has occurred, and control passes to block 360 where the transaction is aborted. Otherwise if the transaction successfully completes and the hardware properties remain, control may pass to block 355 where the transaction is committed.

Referring still to FIG. 3, if instead during execution of a cache resident transaction, the transaction overflows the cache (as determined at diamond 335), control passes to block 375. There the transaction may be rolled back and re-executed in an STM mode. During execution in STM mode, it may be determined whether a semantic has been violated (diamond 380). If so, control passes to block 382, where the transaction may be rolled back and re-executed in a lower performant mode, e.g., a pure STM mode. Similar operations with respect to determining whether the transaction completes and whether it can be successfully committed or an abort is needed may occur (blocks 385, 390, 392, 395), as discussed with regard to hardware assisted transactions. While described with this particular implementation in the embodiment of FIG. 3, understand that control of a given mode in which to perform a transaction may vary in different implementations.

The method of FIG. 3 thus generally sets forth how to determine an appropriate mode to begin a transaction. During a transaction, however, failures may occur for reasons other than a cache overflow or STM failure. In various embodiments, fallback and upgrade mechanisms may be implemented to determine which mode a new (or re-executing) transaction should be executed in, so that the constraints described above are satisfied and the system achieves optimal performance. Table 2 below shows a set of reasons for dooming (terminating) a transaction. The first column in Table 2 describes various reasons that could doom a transaction and the second and third columns respectively describe the new mode a previously pending CRITM or CRESTM transaction will be re-executed in. Cells left blank indicate that the transaction will not be doomed for a given reason.

TABLE 2

| | Reason | CRITM | CRESTM |
|---|---|---|---|
| 1 | Another transaction contains 'Retry' | CRESTM | |
| 2 | Current Transaction Contains 'Retry' | STM | STM |
| 3 | Open Nested Transaction/full suppress is required | STM | STM |
| 4 | Exceeds cache capacity | STM | STM |
| 5 | Close Nested Flattened transaction throws an exception | STM | STM |
| 6 | Code needs to be JIT'ted | CRITM | CRITM, CRESTM |
| 7 | Transaction dooms itself (for e.g. when modifying the object header if punch-thru CAS is not available) | CRITM, STM | CRITM, CRESTM, STM |
| 8 | GC suspends thread executing current transaction | CRITM | CRITM, CRESTM |
| 9 | One or more STM transactions startup | CRESTM | |
| 10 | All STM transactions terminate | | CRITM |
| 11 | Loses monitoring | CRITM | CRITM, CRESTM |
| 12 | Loses buffering | CRITM | CRITM, CRESTM |

Note with regard to Table 2, the first priority will be to re-execute in CRTIM mode. However, if the transaction requires functionality that is not available in CRITM mode or STM transaction(s) are in progress, then the transaction will be re-executed in CRESTM mode. The decision to terminate a CRESTM transaction for this reason would be based on heuristics. Also no CRITM transactions should be running at this point.

Note that there may be latitude in the design choices shown in Table 2. For example, it is possible to design a mode that is cache resident but still provides software-based failure atomicity. Such a mode could be used to address a nested transaction failure.

Figure 4:
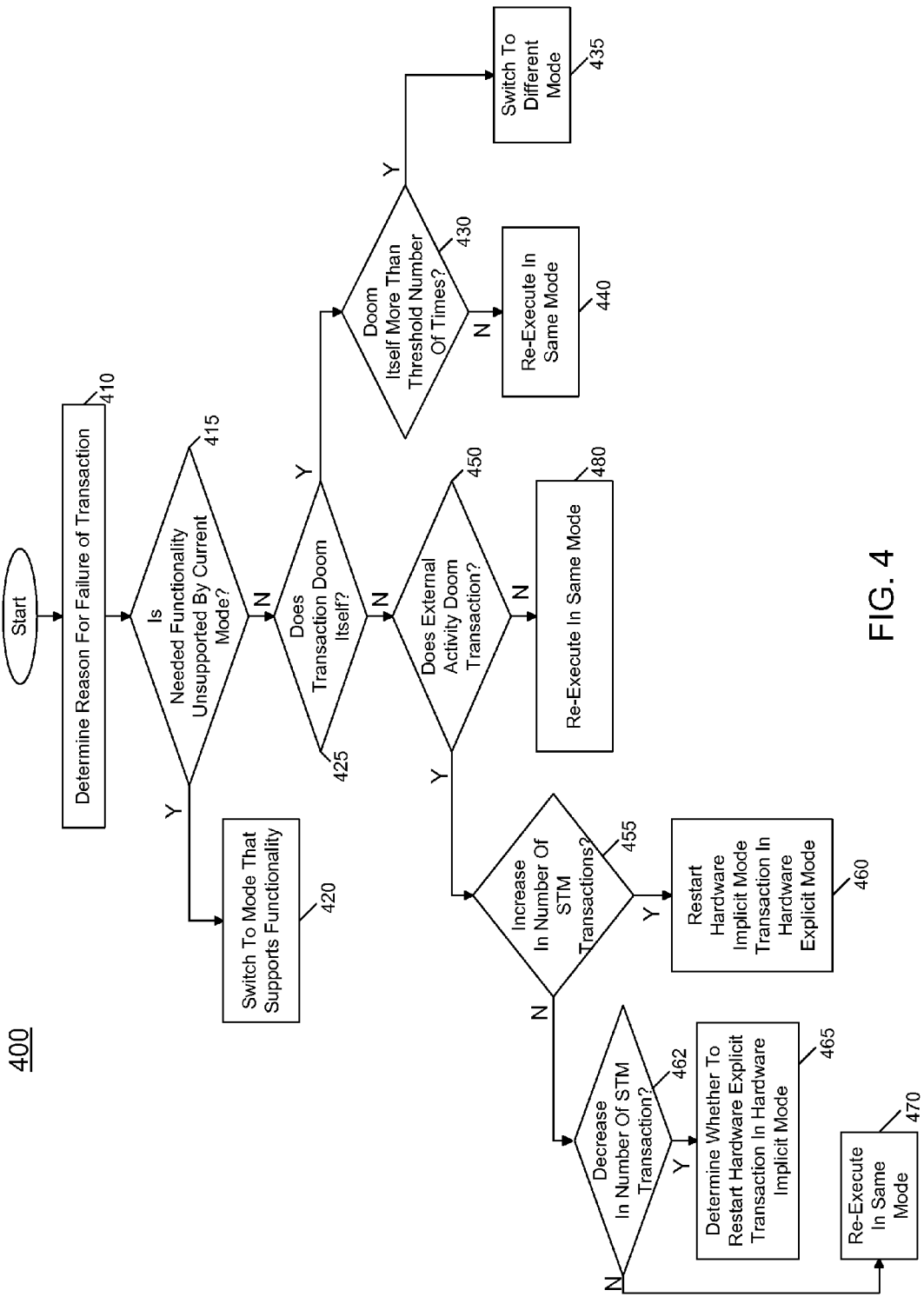
FIG. 4 is a flow diagram of a method of handling mode switching as a result of a failure of the transaction executing in a particular mode.

Referring now to FIG. 4, shown is a flow diagram of a method of handling mode switching as a result of a failure of a transaction executing in a particular mode. Method 400 of FIG. 4 may be implemented, in one embodiment by an ejection handler that receives control upon a failure of the transaction in a first mode. As seen, method 400 may begin by determining a reason for a failure of the transaction (block 410). This determination may be made on the basis of various information received. As examples, information of a TCR and/or TSR may indicate the reason for the failure. Similarly, a transaction control block may also indicate the reason for the failure. Still further in other implementations other manners of obtaining this information may be used.

Still referring to FIG. 4, in general, different recovery paths, e.g., different paths to re-execute the transaction may be selected based on the reason for dooming the transaction. Furthermore, while described and shown with a particular order in the embodiment of FIG. 4, understand that this is for convenience of discussion and the various determinations made can occur in different orders (and in different manners) in various implementations. As seen, at diamond 415 it may be determined whether needed functionality was unsupported by the current transaction mode. Examples of such unsupported functionality will be discussed below. If this is determined to be the cause for the transaction failure, control may pass to block 420 where selection of another mode that supports this functionality may occur. Accordingly, the transaction may be re-executed following a mode switch to this new mode.

Yet another reason for dooming a transaction may be that the transaction dooms itself, as determined at diamond 425. If so, it may also be determined the number of times that the transaction has doomed itself. This number can be compared to a threshold (diamond 430). If the number is above this threshold, indicating that the transaction continues to doom itself, the transaction may be switched to a different mode (block 435). If the threshold is not met, re-execution may occur in the same mode (block 440).

A still further reason for dooming a transaction may be whether external system activity caused the dooming. If this is determined (at diamond 450) it may then be determined whether this external activity was an increase in the number of pending STM transactions (diamond 455). If so (and the current transaction was a hardware implicit mode transaction), the transaction may be re-executed in a hardware explicit mode (block 460). If instead of an increase in the number of STM transactions, it is determined that in fact there was a decrease in pending STM transactions (as determined at diamond 462), a determination may be made whether to restart a pending hardware explicit transaction in a hardware implicit mode, as this is more performant (block 465). Different considerations in making this determination will be discussed further below. If a change in STM transactions is not the external system activity, the transaction may be re-executed in its current mode (block 470). Similarly, if there is some other reason for the failure of the transaction, e.g., due to a conflict or another such reason, the transaction may be re-executed in the same mode (block 480). While shown with this particular implementation in the embodiment of FIG. 4, understand the scope of the present invention is not limited in this regard.

The reasons described above in Table 2 and discussed in FIG. 4 can be categorized into four broad categories. For each category, the fallback and upgrade mechanism is described. A first failure cause category may be functionality not supported by a given execution mode. Reasons 1-5 fall into this bucket for CRITM. For CRESTM, reasons 2-5 fall into this bucket. These reasons are integral to the transaction and expose limitations in the current execution mode. Thus re-execution of the transaction should not be in the same mode it was executed earlier, and instead a switch to a mode that has the required support may occur. To support this functionality a durable write may be performed (when the transaction is doomed) to the transaction context, specifying the mode which should be used when the transaction is re-executed.

A second failure cause category may be where a transaction commits suicide (dooms itself). Reasons 6 and 7 fall into this category. For reason 6, the transaction may be rolled back, a compilation (e.g., a just-in time (JIT)) of the required block may be performed, and then the transaction is then re-executed in the same mode. This is because JIT'ing a function is quite expensive, so the overhead of rollback and re-execution will not be noticeable. For reason 7, the transaction can be re-executed in the same mode. This is done since firstly, a monitored/buffered line may not contain the object header next time around and secondly, there is no way of knowing that the monitoring (or buffering) loss happened because of a write to the object header. In some implementations, a safeguard may be provided for the scenario where a transaction keeps dooming itself because of writes to the object header. As one example, a rule may be set that any CRITM/CRESTM transaction that re-executes N (larger than some pre-determined threshold) times will be re-executed in STM mode.

A third failure cause category may be where system activity external to the current transaction dooms it. Reasons 8-10 fall in this category. For reason 8, even if the transaction was rolled back due to garbage collection (GC) suspension, there is no reason not to retry in the same mode, and thus the transaction may be re-executed in the mode in which it was executing earlier. For reason 9, a global counter may be maintained of the currently running STM transactions in memory. Whenever a new STM transaction begins, this counter may be incremented (e.g., via an InterlockedIncrement) and when a STM transaction rollbacks/aborts/commits, a corresponding decrement (e.g., via an InterlockedDecrement) may occur on the counter. CRITM transactions may also perform a monitored read on this global counter, so that whenever a STM transaction starts up, all CRITM transactions are doomed and re-executed in CRESTM mode.

CRITM is the most performant mode, and thus aggressively dooming a CRITM transaction may be sought to be avoided. One solution may be that whenever an STM transaction is about to start, it first checks whether the system currently contains a running CRITM transaction. If the system does contain a CRITM transaction, then the STM transaction may be controlled to wait for a finite amount of time before starting. Such wait time may allow the currently running CRITM transactions to finish execution without delaying the STM transaction too much.

For reason 10, whenever all STM transactions in the system terminate, one implementation may be to doom all CRESTM transactions and re-start them in CRITM mode. However, a spin mechanism may be performed in case a CRESTM transaction is about to complete before dooming it. The final decision here would be based on CRESTM overhead compared to CRITM: if on average a CRESTM transaction is more than twice as slow as a CRITM transaction, then it would be more performant to doom CRESTM transactions and restart them in CRITM mode, otherwise it would be more performant to continue in CRESTM mode. In yet other implementations, it may be possible to transition a running transaction from CRESTM to CRITM mode.

A valid read-write (r-w) or write-write (w-w) conflict may occur on a buffered/monitored block. Reasons 10 and 11 belong to this category. If a transaction is doomed because it lost monitoring or buffering on a cacheline, then it can retry in the same mode as earlier. One concern here is that if a new transaction accessing a cache line dooms an older transaction, then the old transaction might doom the new one when it restarts. This could lead to a ping-pong effect where neither transaction completes. Contention management logic may be use to handle such situations.

In some implementations an optimization, when a transaction is about to start or restart execution is that if the only reason it needs to start in CRESTM mode is that 'the system contains one or more STM transactions', then a spin mechanism may be used to wait before retrying. If after the wait, STM transactions are still running the current transaction can be started in CRESTM mode, otherwise the transaction can be started in CRITM mode and CRESTM overheads can be avoided. Similar logic can be applied to any CRESTM transactions that are re-starting. So in the above discussion when a transaction should be re-started in the same mode, there is a caveat that if that mode is CRESTM, then it may first be determined if the transaction can be run under CRITM mode.

For purposes of discussion, CRESTM uses TV code-generation style, and exception-based rollback, while CRITM uses NK code-generation style, and longjmp-based rollback.

Consider now how a lexical atomic block (generally referred to as "s") should be translated. (For purposes of this discussion, assume all state about a transaction is kept in the current transaction object, ignoring transaction contexts). The "CreateTx" primitive takes a "ConstantSiteId," a unique small, dense, integer ID identifying the lexical transaction. This ID is used to index into a global data structure containing contention management information about lexical transactions. This structure may also be used to store persistent information indicating in which execution mode to begin the transaction. The primitive may set this information as attributes of the transaction.

Three translations of a code block into TM-supported code are provided below in Tables 3-5. The pseudo code of Table 3 assumes that CRESTM and STM are the only execution modes, the pseudo code of Table 4 assumes that CRITM is the only execution mode, and the pseudo code of Table 5 attempts to allow for all three possibilities.

If CRESTM and STM are the only execution modes, then the translation is set forth in the pseudo code to Table 3.

TABLE 3

```
atomic { S }
→
    curtx = CreateTx(curtx, ConstantSiteId);
    <save live locals to "shadow variables" on stack.>
L:
    curTx.StartHWTx( );   // Begin the current hw tx if we're using it.
    try {
        // First arg indicates transform style.
        STMTransform(CGSTYLE_TV, S);
    } catch (Object ex) {
        <restore locals from shadow variables on stack>
        curtx.HandleEx(ex); // Roll back TX and return, else throw.
        goto L;
    }
```

As seen in Table 3, the transaction may be created using a "createTx" primitive. Its SiteID will determine a set of initial attributes, including the transaction vtable currently in use. In all of the modes, live local variables (or, just those that may be modified in the transaction) may be saved to stack locations. After that, the hardware transaction is started if the current execution mode is using hardware acceleration. The transaction executes. If it rolls back, a catch clause is reached, since a handler exception-based rollback issued. The local variable values may first be restored. This is necessary whether the handler (HandleEx) decides to re-execute (by returning) or to marshal and rethrow an aborting user execution—the local variables may be live in a catch clause that catches the thrown exception. If the handler decides to re-execute, it may alter attributes of the transaction "curtx." For example, it might change the transaction vtable to use STM instead of CRESTM.

If CRITM is the only execution mode, then the translation is set forth in the pseudo code of Table 4.

TABLE 4

```
atomic { S }
→
    curtx = CreateTx(curtx, ConstantSiteId);
    <save live locals to "shadow variables" on stack.>
    curtx.SaveSetjmpState( );
    if (curtx.IsRexec( )) {
        <restore locals from shadow variables on stack>
        // Could decide on (re-)execution mode here.
    }
    curTx.StartHWTx( );   // Begin the current hw tx
    try {
        // First arg indicates transform style.
        STMTransform(CGSTYLE_NK, S);
    } catch (Object ex) {
        <restore locals from shadow variables on stack>
        curtx.HandleEx(ex); // Marshal ex; Roll back TX; throw.
        assert(false);
    }
```

As seen in Table 4, it is assumed that the "SaveSetjmpState" operation saves not only the stack pointer, base pointer and instruction pointer (ESP), (EBP), and (IP), but also all callee-save registers, for reasons discussed above. The IP it saves may be just after the call to SaveSetjmpState, so, just like setjmp/longjmp, operations can resume as if returning from the call. The ejector will restore the saved register values, and jump to the saved IP. Note, that the "naked" transformation of S is not precisely equal to S, as there may be some explicit actions to commit the transaction when control flow leaves S. Since a longjmp-based rollback occurs, only user-level exceptions that are being thrown reach the catch clause. As in CRESTM, saved local variables (for the same reasons) are restored. HandleEx would deep-clone the exception, abort the hardware transaction, and then re-throw the cloned exception. On the first execution, curtx.IsRexec( ) is false, so locals are not restored. On the second and subsequent executions for a given transaction instance, this condition is true, and thus the local variables are restored each time. This is in addition to restoring locals in the catch clause, since re-executions via longjmp do not go through the catch handler. When an ejector is entered to re-execute, decisions about the mode in which the re-execution should be executed can be recorded in the transaction data structure. While this can be done in the ejector, stack overflow may occur if significant code is executed there. Another alternative is to have the ejector record relevant data on which the decision will be based in the transaction data structure, and decide on and install the new execution mode after this IsRexec( ) test—this possibility is shown in Table 4 via a comment.

A combined translation that assumes the possibility of CRITM, CRESTM, and STM modes is set forth in the pseudo code of Table 5.

TABLE 5

```
atomic { S }
→
    curtx = CreateTx(curtx, ConstantSiteId);
    <save live locals to "shadow variables" on stack.>
    if (curtx.LongjmpRollback( )) {
        curTx.SaveSetjmpState( );
        if (curtx.IsRexec( )) {
            <restore locals from shadow variables on stack>
            // Could decide on (re-)execution mode here.
        }
    }
L: curtx.StartHWTx( );   // Begin the current hw, if HW is being used.
    try {
        if (curtx.CodeGenStyle( ) == CGSTYLE_NK) {
            // First arg indicates transform style.
            STMTransform(CGSTYLE_NK, S);
        } else {
            STMTransform(CGSTYLE_TV, S);
        }
    } catch (Object ex) {
        <restore locals from shadow variables on stack>
        curtx.HandleEx(ex); // Roll back TX, throw.
        goto L;
    }
```

As to the pseudo code of Table 5, consider an execution of a transaction that starts in CRITM mode, encounters contention or resource limitations, makes a contention management decision to re-execute in CRESTM, again encounters contention or resource limitations, and therefore re-executes again, this time successfully, in STM.

Information associated with the ConstantSiteId will determine that the transaction can first execute in CRITM mode. In all modes, the live-and-modified locals are first saved to shadow variables in the stack frame (doing so durably, if this is a top-level transaction). The transaction can be set up so that LongjmpRollback returns true, so it will do the setjmp-equivalent. As discussed before, if this is a re-execution (which it is not in this example) the saved locals may be restored. The hardware transaction is then started and the CGSTYLE_NK version of the STM transform of S is executed. The CRITM execution loses monitoring or buffering, and enters the ejector, and thus the current hardware transaction is aborted.

The transaction may make a contention management decision, deciding to re-execute in CRESTM mode. It changes some attributes of the transaction, including the transaction vtable. It then restores the saved register values and jumps to the saved IP, thus resuming as if SaveSetjmpState had just returned. (As discussed previously, if desired it could do less contention management work in the ejector, and perform the setting of the new execution mode after the "IsRexec( )" test.)

A new hardware transaction is started and the CGSTYLE_TV transformation of the code is executed. At some point a loss of monitoring or buffering may be detected, and an internal ReExecuteException is raised, thus reaching the exception handler, and restoring local variables from their shadow copies. The saved local variable values are restored and the HandleEx is called, which determines that the raised exception is a ReExecuteException. At some point, either earlier, before raising the exception, or here, a contention management decision determining the next execution mode is made, and the attributes of the current transaction are adjusted appropriately. In this case assume that the decision is to re-execute in STM mode. Since re-execution occurs, HandleEx returns rather than re-raising, and thus control returns to the label L again. On this execution, StartHWTx is a no-op, since hardware acceleration is not used the CGSTYLE_TV transform of the body, and STM barriers are executed. This time the transaction succeeds and is committed.

Table 6 below provides a comparison of various properties of TM execution in accordance with an embodiment of the present invention.

TABLE 6

| Property | CRITM | CRESTM | HASTM |
|---|---|---|---|
| Uses hw metadata for filtering | N | N | Y |
| Buffers writes | Y | Y | N |
| Monitors reads | Y | Y | Y |
| Maintains a write log | N | N | Y |
| Requires data to be cache resident | Y | Y | N |
| Compatibility | CRITM | CRESTM, HASTM, STM | CRESTM, HASTM, STM |
| Supports retry | N | N | Y |
| Supports notification | N | Y | Y |
| Rollback mechanism | Longjmp based | Exception based | Exception based |
| Requires TV code-gen | N | Y | Y |

Thus in various embodiments, a switching state machine may be used to execute transactions in multiple modes, including implicit and explicit cache resident, HASTM, and STM. For example, a transaction may begin in CRITM and then switch on overflow. In addition, other threads' transactions can be switched when some thread enters an STM lock mode. Switching modes on rich semantics or features such as deterministic commit order or retry may occur, and switching back to CRITM mode can occur when no STM threads remain.

Embodiments may use UTM support for explicit monitoring and buffering control instructions to efficiently execute smaller simple transactions without logging and shadow copy buffering, while correctly co-existing with unbounded publication-and-privatization-correct STM/HASTM transactions which use a software locking and logging discipline. Thus a UTM system may allow fast cache resident transactions to execute alongside STM transactions (even those on software threads that are not scheduled to cores). In a hardware implicit mode, particularly for managed code, accesses to internal runtime data structures and the stack may be unnecessarily added to the cache managed transaction read and write sets. In CRESTM's non-implicit mode use (through software) of cache monitoring and buffering instruction facilities, a transaction can monitor and buffer only the user data that requires transaction semantics. The stack, the data accesses that occur during sojourns into CLR helper code or the CLR runtime itself, do not use cache monitoring and buffering and thus will not in themselves contribute to an eviction (capacity miss)-based cache resident transaction abort.

As described above, transactions execute in various hardware accelerated modes like CRITM and CRESTM before falling back to HASTM or STM due to cache capacity or use of semantics not implemented in hardware. With CRESTM, a cache-resident STM-respecting explicit transaction memory mode is provided that can interoperate with both STM and CRITM transactions. Then when a fallback to STM happens for one transaction, the others can switch to CRESTM, but all transactions do not have to go all the way to the most inefficient STM mode. Similarly, an upgrade can happen gradually, with first STM transactions finishing while the rest of the system works in CRESTM mode, then CRESTM transactions finishing while the rest of the system is already in the most efficient CRITM mode.

Using an accelerated memory barrier in accordance with an embodiment of the present invention, execution characteristics may be improved by eliminating the overhead of a write log, eliminating the need for hardware transactions to allocate timestamps from a global pool, increasing concurrency amongst CRESTM transactions and between CRESTM and STM transactions and reacting adaptively to contention between CRESTM and STM transactions.

An object header (OH) can be used within the CRITM and CRESTM transaction modes. These modes may interact with a compare and save (CAS) protocol on the OH used by other parts of the system, as all uses of OH cannot be switched to TM and since hardware cannot support open nested transactions. Certain changes to the OH must be durable. A hash code (HC) is most notable in this respect. The requirement for a stable HC for an object further implies that changes to a SyncBlockIndex (SBI) also be durable. For CRESTM, there is no need to suppress and re-enter because the transaction will not access the SyncBlock management data structures using transactional reads or writes. Objects created inside a transaction are not visible globally so modifications to their headers can be buffered as well.

CRESTM interoperability with STM provides a lock-respecting hardware mode in a global version clock system. The following overriding assumptions are made. A global version clock scheme is used to provide for publication correctness, some form of a commit ticket protocol and buffered writes are used to provide for privatization correctness, write locks are acquired at encounter time (e.g., via an OpenForWrite( ) function), and optimistic reads are validated at commit time, after taking the commit ticket.

Global version clock integration can be realized by having the hardware transaction maintain a write log, and to update metadata (e.g., a transaction record or transaction metadata word (TMW)) with a write variable (WV) during the proper phase of commit. The hardware algorithm is as follows: start a hardware transaction and execute a write barrier before writes. In one embodiment, this barrier may be a buffered write for o.tmw="locked by me", and the address of the object is logged into a transaction-local write log, and the TMW is monitored. A read barrier is executed before every read in which a locked bit is checked and the transaction is aborted if a lock is present (unless "locked by me"), and the TMW may be monitored. After the body is done, a WV can be acquired for this transaction using logic in a suppress region. Then the list of written addresses can be used to update every o.tmw to WV with a buffered write, and the hardware transaction is committed. Thus the WV is acquired after all write locks have been acquired. In hardware mode, "acquire write lock" means that monitoring exists on the proper TMW.

This scheme can have poor performance due to the need to maintain a write log. In some embodiments, it may be possible to be lock respecting without a write log, and thus the need to maintain a write log can be eliminated. Optimizations of a global version numbering implementation may be made using two assumptions. First, it is assumed there will be far more CRESTM transactions than STM transactions; and second it is assumed actual data conflicts are rare. The first assumption is motivated by the fact that the fall-back of one transaction into STM does not necessitate that other transactions move into STM. It is expected that falling back into STM will be rare and thus the 'victim' will be a lone transaction while other transactions continue to execute in CRESTM. In a sufficiently parallel system, this means there will be many more CRESTM transactions than STM transactions. The second assumption is workload dependent but is generally the hallmark of good design and is thus prevalent in successful programs.

A CRESTM transaction uses a common version number, denoted by a hardware global version number (HGV), to stamp any object that it is modifying. STM transactions guarantee that the HGV is strictly larger than a software-based global version number (GV), such that any write by a concurrent CRESTM transaction correctly appears as a conflict. HGV can be increased in batches such that maximal concurrency is guaranteed as long as no data conflict occurs. Data conflicts are handled by degenerating to the most basic policy and then re-starting gradually on a more aggressive path again.

To be lock respecting without a write log, the following operations may occur in a hardware transaction. Assume both GV and HGV start at 0. Each hardware transaction may first set a stamp value (SV)=HGV. The HGV is read with monitoring, so any write to it will doom all hardware transactions. A write barrier may be performed before writes, e.g., using a buffered write for o.tmw=SV, and the TMW is monitored. A read barrier may be performed before every read in which the locked bit is checked and the function aborted if a lock is present, the TMW is monitored and the transaction commits with the ticket protocol. Thus for hardware transactions no log of the objects that are tentatively changed is maintained; instead, objects tentatively changing are stamped with HGV; and if the transactions commit, the timestamp becomes permanent, together with the data changes.

Each software transaction may set a read variable (RV)= GV. If (HGV<RV+1) compare and set (CAS)(HGV, RV/*expected*/, GV+1/*new*/). Now hardware is stamping into the future, and all current hardware transactions are doomed. Transaction execution is conventional for STM, e.g., locks acquired at encounter time, etc., when the transaction is ready to commit. A write variable (WV) is set such that it equals the GV after incrementing. The increment to the GV ensures that any in-flight hardware transactions are doomed and stamped into the future if this transaction rolls back and then re-executes. The read set is validated using RV, and then all write locks released using WV. No write lock is maintained, but the downside is that each time a software transaction starts after another software transaction has completed (either for commit or roll back), then all hardware transactions are doomed. This behavior can be mitigated by advancing HGV by more than one at a time. If it is advanced by, e.g., 10, then 10 more software transactions may start after seeing some other software transaction complete before all hardware transactions are doomed.

Thus when a software transaction begins, it samples GV and stores the retrieved value in a local variable RV. It proceeds to affect reads and writes as prescribed by the program. When the transaction is ready to commit, the GV is first checked to determine whether an increment would make GV reach the value of HGV. If so then HGV is incremented by a quantity B (the value of which will be discussed below).

These rules provide the safety necessary to ensure that conflict is always detected. In general conflict detection may occur as follows: CRESTM vs. CRESTM conflicts are detected at the hardware level as conflicts on raw data accesses; CRESTM vs. CRITM conflicts are also detected at the hardware level as conflicts on raw data accesses; an STM transaction that happens to incur a conflicting access to an object that is currently monitored and/or buffered by an CRESTM transaction will cause the CRESTM transaction to rollback; a CRESTM transaction invalidating data accessed by a STM transaction will be detected by the STM transaction no later than during the STM validation phase as the HGV stamped on the object will necessarily be greater than the GV probed at the beginning of the STM transaction.

As described above, the value of B, or "batch size" is the quantity by which HGV is allowed to diverge from GV. As noted above, whenever GV reaches the value of HGV, HGV is incremented by B. Whenever this happens, all currently executing CRESTM transactions are rolled back, since they are monitoring the location of HGV. Thus, the larger B is, the less frequent such invalidations would occur. On the other hand, once an STM transaction observes an object with a version number higher than the current GV, it would have to advance GV to that higher number in order to ensure that on its next re-execution it would be able to read the object successfully. If B is large, then such 'skips' through the version space may cause the version space to be consumed faster and this may be a concern for systems where the version space is limited and wrap-around is costly (e.g., it may need to renumber all the objects in the heap).

Embodiments may adapt the value of B such that as long as the data accessed by different transactions is disjoint, B is allowed to be large, but as soon as sharing is detected, B's value is reduced. The first ingredient in this mechanism is an effective detection method. That is, an STM transaction needs to be able to discern, with high probability that it has indeed read a value that was produced by a hardware transaction with a 'high' HGV number. To realize this, the transaction compares the version that the object contains to GV. If the object's version is higher, then the object was stamped with an HGV. In any case a transaction observes an object with a version number higher than the current GV, the transaction advances GV to at least the version number it saw.

As soon as the conflict situation is handled, the value of B is reduced to ensure that reoccurrences of such a situation are less costly in terms of version space consumption (although, for a system with a very large version space, this may not be much of a concern). Any policy that allows 'fast shrink/slow growth' is acceptable. For example, whenever a conflict situation is detected, the value of B is halved, but is never made smaller than 1, and whenever it is time to increase HGV by B, the value of B is incremented as well, but by a fixed quantity, e.g., 1, and only up to a predetermined cap value.

Figure 5:
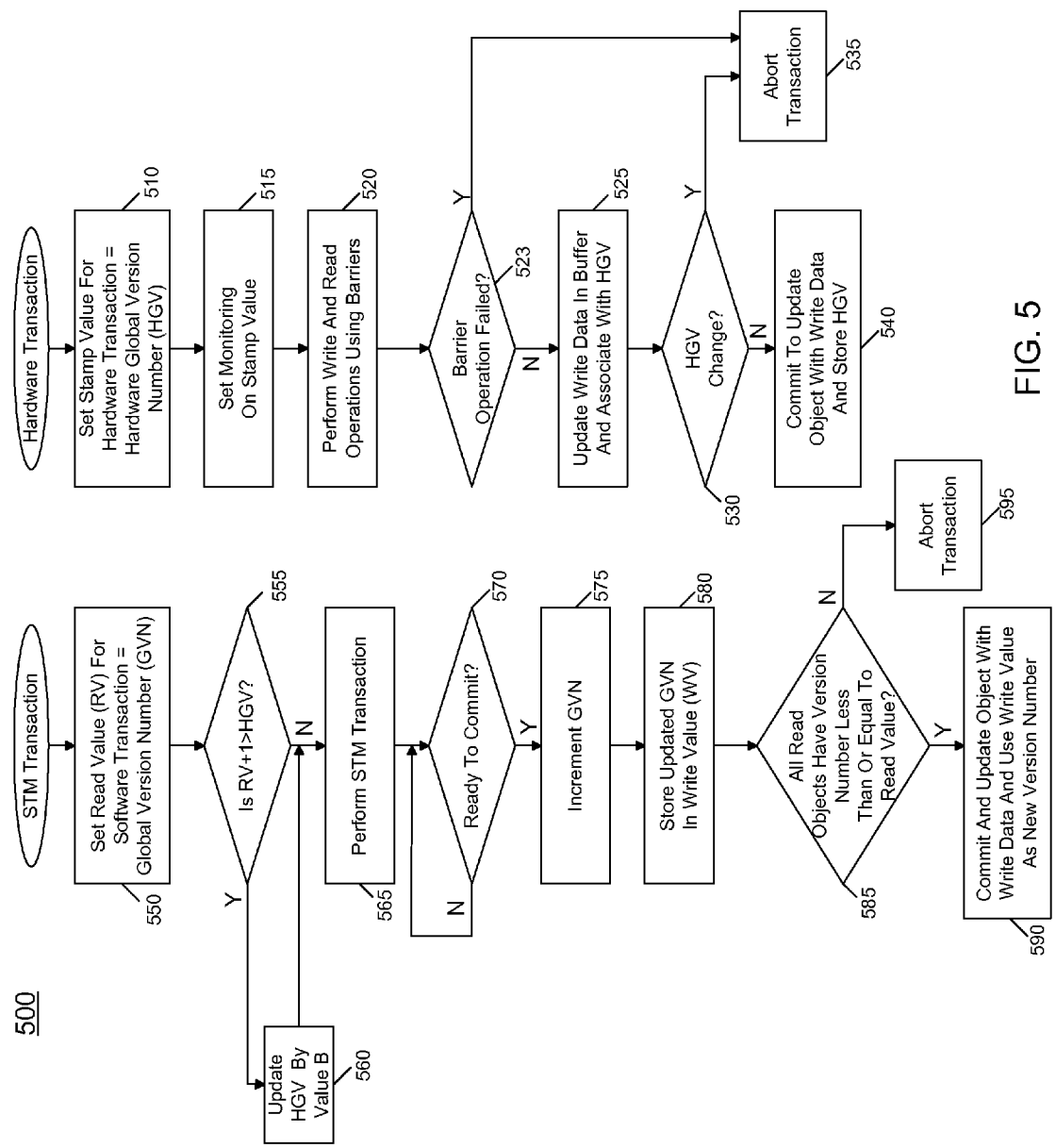
FIG. 5 is a flow diagram of a method for handling hardware and software transactions concurrently in accordance with an embodiment of the present invention.

Referring now to FIG. 5, shown is a flow diagram of a method for handling hardware and software transactions concurrently in accordance with an embodiment of the present invention. As shown in FIG. 5, method 500 may include code paths both for hardware transactions and software transactions. First with regard to hardware transactions, a stamp value may be set that equals the HGV (block 510). In addition, monitoring may be set for the location of this stamp value such that the hardware transaction is informed if the HGV is updated (block 515). During execution of the hardware transaction, various read and write operations may be performed, each of which may be implemented using a corresponding read or write barrier (block 520). For each such barrier it may be determined whether the barrier operation failed, e.g., due to a lock present on a location to be read or written (diamond 523). If so, the transaction may be aborted (block 535). If a given barrier operation is successful for a write operation, write data may be updated in a buffer and the data may be associated with the current HGV (block 525). At conclusion of the transaction, it may be determined whether the HGV has changed (diamond 530). If so, this indicates that a conflict has occurred, e.g., between this hardware transaction and a software transaction and accordingly, the hardware transaction may abort (block 535). Otherwise, control passes to block 540, where the updates may be committed, such that each updated value may be stored to memory and may be associated with the HGV to indicate the version number at which it was updated.

For a software transaction, at initiation a read value may be set that corresponds to the current GVN (block 550). Then it may be determined whether incrementing this read value would cause the result to be greater than the current value of the HGV (diamond 555). If so, the HGV may be updated, which causes all pending hardware transactions to be doomed. More specifically, control passes from diamond 555 to block 560, where the HGV value may be updated by an adaptive batch size, B. Note that the operations of diamond 555 and block 560 may be performed atomically in hardware using an atomic compare-and-exchange instruction. From either of diamond 555 or block 560, control passes to block 565, where the STM transaction may be performed. In general, various data may be read, operations performed and values updated, using software locks to obtain ownership of any written values. At the conclusion of such operations, it may be determined whether the transaction is ready to commit (diamond 570). If so, control passes to block 575, where the GVN is incremented (block 575). In one embodiment, this increment may be by one. This updated GVN may be stored in a write value associated with the software transaction (block 580). Note that the operations of blocks 575 and 580 may be performed atomically in hardware, e.g., using an atomic increment instruction that returns the new value of GVN into the write value. Then it may be determined whether all read objects have a version number less than or equal to the read value (diamond 585). If not, the transaction may be aborted (block 595). If the validation of diamond 585 is instead successful, control passes to block 590 where the transaction is committed and the write value may be used as the new version number for all objects in the write set. In other words, the write locks of the objects in the write set are released by giving them a new version number equal to WV. While shown with this particular implementation in the embodiment of FIG. 5, the scope of the present invention is not limited in this regard.

Code generation resolves to two most mostly independent decisions which together result in a transaction execution mode. First, code generation style can be done using Naked (NK) mode or Transactional VTable (TV). Second, for a rollback mechanism, when the decision is made to re-execute a transaction, it may be determined how the modifications made are rolled back and how control is transferred to the beginning of the transaction.

For code generation style a transaction context structure (possibly shared by members of the same sequential nest) can be augmented with a sub-structure called a transaction vtable. This is a structure whose elements are function pointers, one for each of the kinds of STM JIT helpers for STM mode. Other modes can be created so that the same TV generated code can be used for multiple modes, by dynamically changing the transaction vtable.

When a transaction detects inconsistency or explicitly aborts, all state changes are rolled back and control returns to the beginning of the transaction. CRESTM and a pure-software exception-based mechanism raise an internal exception to accomplish rollback. This exception cannot be caught by any handler except for the one inserted as part of the translation of a transaction during code generation.

Transaction nesting may occur. A discussion of close nested transactions is first provided, and suppress behavior is described in the context of open nested transactions since the concepts are related. A given hardware architecture may not support any form of nesting. Instead, a flat model may be supported where cache lines that are touched are buffered and monitored and may be committed atomically to memory, or rolled back with their tentative effects vanishing with no trace. Failure atomicity for nested transactions, however, states that if a nested transaction rolls back, only its effects are undone and the effects of the parent transaction are preserved (yet still only tentatively).

Flattening is an optimistic technique that assumes that transactions are not likely to rollback and therefore no collection of nested undo information occurs. The general algorithm is as follows. When entering a nested atomic block, a nested closed transaction is set up and a try/catch block placed around its execution. If the nested transaction commits, which is the common case, execution of the parent is resumed and the effects of the child are now subsumed into the parent and there will never arise the need to undo them selectively. If on the other hand the nested transaction code percolates an exception, then in a system with true nesting support only the nested transaction would be rolled back and the exception would resurface in the context of the parent. In implementations in which the child transaction cannot be independently rollbacked, the entire transaction nest may be rolled back and re-executed in a mode that support true nesting.

Similar to other circumstances where roll-back of a cache-resident transaction occurs, the following mechanism may be employed. At the point a doom determination of the nest is made, durable writes may be made to the transaction context, essentially setting forth why the transaction rolled back and what kind of re-execution mode is required next. Then the execution stack is rolled-back and an enclosing exception handler surrounding the entire nest may be performed, e.g., using a normal exception. Recovering from flattening failures may occur by re-executing in HASTM mode.

Broadly speaking CRESTM allows small and simple transactions to run without locking or logging even in the presence of other unbounded STM transactions, providing overall a fast and rich, full featured, limited-weakly-atomic-correct TM programming model. The use of explicit mode transactions allows software to optimize its use of the precious limited state of the private cache's UTM transactional facilities, and thereby run longer and larger transactions before overflowing to STM. For example, stack accesses and newly allocated objects do not require monitoring or buffering. Embodiments provide an efficient cache resident mode to accelerate the greatest overheads of the limited-weakly-atomic-correct implementation (buffering, logging, locking). In various embodiments, software instructions may explicitly transact only certain user program data accesses.

Figure 6:
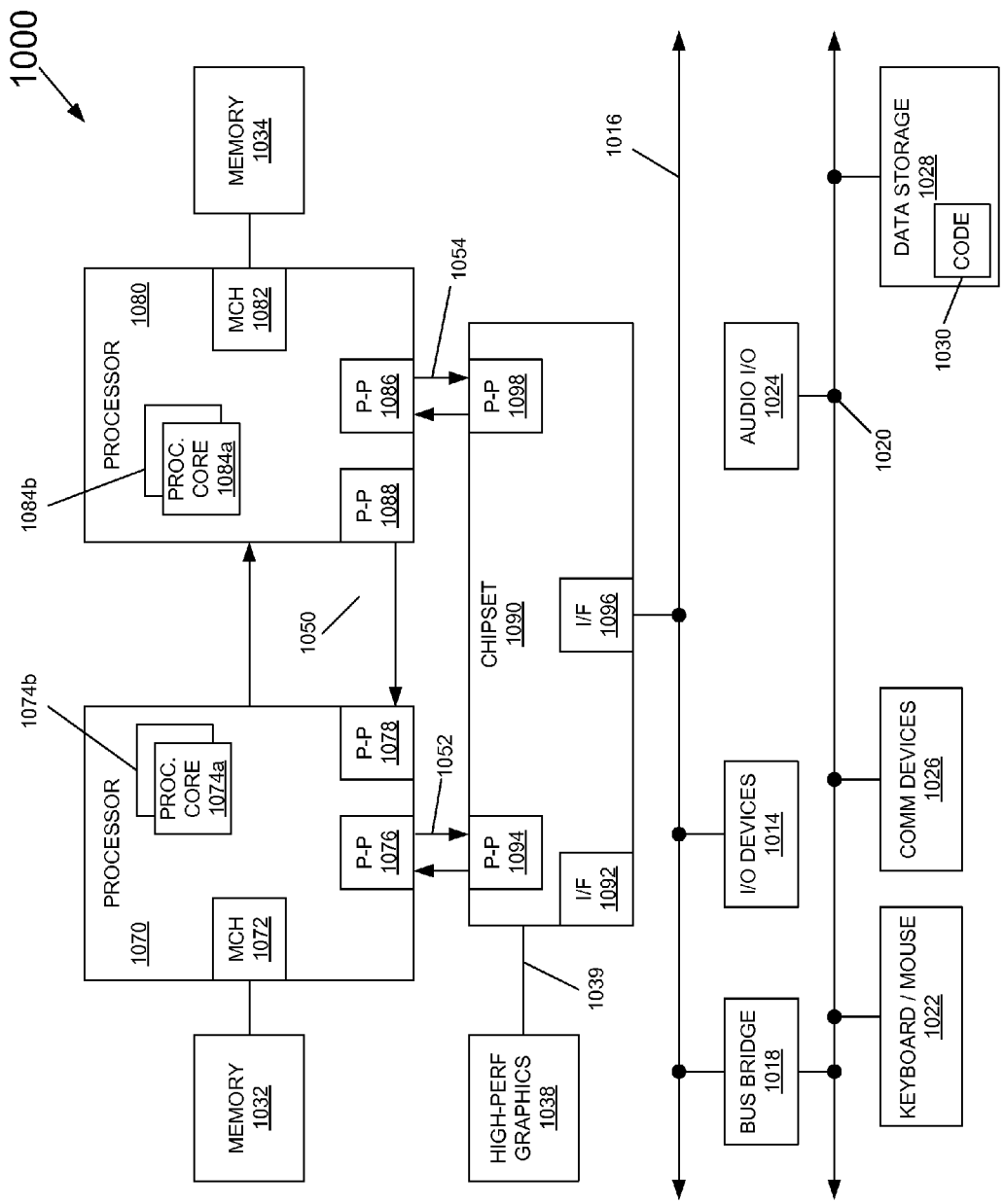
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 1000 is a point-to-point interconnect system, and includes a first processor 1070 and a second processor 1080 coupled via a point-to-point interconnect 1050. As shown in FIG. 6, each of processors 1070 and 1080 may be multicore processors, including first and second processor cores (i.e., processor cores 1074a and 1074b and processor cores 1084a and 1084b), although potentially many more cores may be present in the processors. The processor cores may execute TM transactions using hardware, software, or combinations thereof to enable efficient unbounded transactions.

Still referring to FIG. 6, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 6, MCH's 1072 and 1082 couple the processors to respective memories, namely a memory 1032 and a memory 1034, which may be portions of main memory (e.g., a dynamic random access memory (DRAM)) locally attached to the respective processors. First processor 1070 and second processor 1080 may be coupled to a chipset 1090 via P-P interconnects 1052 and 1054, respectively. As shown in FIG. 6, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 6, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a disk drive or other mass storage device which may include code 1030, in one embodiment. Further, an audio I/O 1024 may be coupled to second bus 1020.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An article comprising a machine-accessible storage medium including instructions that when executed cause a system to:

select a first transaction execution mode to begin a first transaction in an unbounded transactional memory (UTM) system having a plurality of transaction execution modes, the transaction execution modes including a plurality of hardware modes to execute within a cache memory of a processor, at least one hardware assisted mode to execute using transactional hardware of the processor and a software buffer, and at least one software transactional memory (STM) mode to execute without the transactional hardware;

begin execution of the first transaction in the first transaction execution mode;

commit the first transaction if the first transaction completes and does not overflow the cache memory or violate a transaction semantic; and otherwise abort the first transaction and select a new transaction execution mode to execute the first transaction.

2. The article of claim 1, further comprising instructions that when executed enable the system to determine whether other transactions are pending, and if not, select the first transaction execution mode to be a highest performant of the plurality of hardware modes.

3. The article of claim 2, wherein the highest performant mode is an implicit mode in which no locking or version management operations occur.

4. The article of claim 1, further comprising instructions that when executed enable the system to select the first transaction execution mode to be a highest performant of the plurality of hardware modes if no pending transaction is executing in the at least one STM mode.

5. The article of claim 4, further comprising instructions that when executed enable the system to select the first transaction execution mode to be a lower performant one of the plurality of hardware modes if at least one pending transaction is executing in the at least one STM mode.

6. The article of claim 5, wherein the lower performant mode is an explicit mode in which locking operations occur.

7. The article of claim 6, further comprising instructions that when executed enable the system to, during execution of the first transaction in the highest performant mode, determine that a second transaction has begun in the at least one STM mode, and roll back the first transaction to re-execute in the lower performant mode one of the plurality of hardware modes.

8. The article of claim 1, further comprising instructions that when executed enable the system to select the new transaction execution mode to be one of the at least one hardware assisted modes if the first transaction overflows the cache memory.

9. The article of claim 1, further comprising instructions that when executed enable the system to abort the first transaction in the first transaction execution mode if a loss of a hardware property of the first transaction occurs.

10. A method comprising:
receiving an indication that a first transaction executed in a first transaction execution mode failed, the first transaction execution mode one of a plurality of transaction execution modes including a plurality of hardware modes to execute within a cache memory of a processor, at least one hardware assisted mode to execute using transactional hardware of the processor and a software buffer, and at least one software transactional memory (STM) mode to execute without the transactional hardware;
determining a reason for the failure of the first transaction; and
based at least in part on the failure reason, determining a new transaction execution mode for re-execution of the first transaction, including determination of whether the first transaction should be re-executed in the first transaction execution mode or a second transaction execution mode having a higher performance level than the first transaction execution mode.

11. The method of claim 10, wherein determining the failure reason includes accessing a transaction record received with the indication, the transaction record including a value of a transaction status register (TSR) at a point of the first transaction failure.

12. The method of claim 11, further comprising performing a durable write to the transaction record to indicate the new transaction execution mode in which to execute the first transaction.

13. The method of claim 10, further comprising performing a just in time (JIT) compilation of a block of code of the first transaction responsive to the first transaction failure and re-executing the first transaction in the first transaction execution mode after the JIT compilation.

14. The method of claim 10, further comprising re-executing the first transaction in the first transaction execution mode if a counter of a number of times the first transaction has failed is less than a threshold.

15. The method of claim 10, further comprising re-executing the first transaction in a third transaction mode if the first transaction failed due to a change in a number of pending transactions operating in a STM mode.

16. The method of claim 10, further comprising continuing execution of the first transaction in the first transaction execution mode and holding initiation of at least one other transaction that is to execute in another transaction mode for a predetermined time period.

17. A system comprising:
a processor including a plurality of cores and a cache memory, wherein the processor further includes a transaction status register, a transaction control register, and an ejection instruction pointer register to identify a location of an ejection handler, wherein the processor is to concurrently execute a first transaction using a hardware transaction execution mode and execute a second transaction using a software transaction execution mode, and within the second transaction, determine if incrementing a read value of the second transaction corresponding to a global version counter used in the second transaction would cause the read value to exceed a hardware global version counter used in the first transaction and if so update the hardware global version counter by an adaptive batch size; and
a dynamic random access memory (DRAM) coupled to the processor.

18. The system of claim 17, wherein the processor is to monitor a stamp value corresponding to the hardware global version counter in the first transaction, and abort the first transaction if the value of the hardware global version counter changes, wherein the hardware global version counter change is detected by the monitoring.

19. The system of claim 17, wherein the processor is to execute the first transaction without maintaining a write log.

20. The system of claim 17, wherein the processor is to, responsive to updating the hardware global version counter by the adaptive batch size, adjust the adaptive batch size.

* * * * *